US012230923B2

(12) United States Patent
Consoli et al.

(10) Patent No.: US 12,230,923 B2

(45) Date of Patent: Feb. 18, 2025

(54) HIGH SPEED CONNECTOR WITH MOLDABLE CONDUCTORS

(71) Applicant: TE Connectivity Services GmbH, Schaffhausen (CH)

(72) Inventors: John Joseph Consoli, Harrisburg, PA (US); Chad William Morgan, Carneys Point, NJ (US); Timothy Robert Minnick, Enola, PA (US); David Wayne Helster, Dauphin, PA (US); Ting Gao, Palo Alto, CA (US); Jialing Wang, Mountain View, CA (US); Mark Wartenberg, Redwood City, CA (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 75 days.

(21) Appl. No.: 17/652,179

(22) Filed: Feb. 23, 2022

(65) Prior Publication Data

US 2022/0181824 A1 Jun. 9, 2022

Related U.S. Application Data

(63) Continuation of application No. 16/286,840, filed on Feb. 27, 2019, now abandoned.

(51) Int. Cl.
*H01R 13/6585* (2011.01)

(52) U.S. Cl.
CPC ................................ *H01R 13/6585* (2013.01)

(58) Field of Classification Search
CPC ............ H01R 13/6585; H01R 13/6594; H01R 12/724; H01R 12/727; H01R 43/24; H01R 13/6599; H01R 13/518; H01R 13/6587; H01R 13/648; H01R 12/716; H01R 13/02; H01R 13/405; H01R 13/46; H01R 13/646
See application file for complete search history.

(56) References Cited

U.S. PATENT DOCUMENTS

| | | | | | |
|---|---|---|---|---|---|
| 4,820,201 | A * | 4/1989 | Van Brunt | H01R 13/6588 | 439/607.3 |
| 5,445,542 | A * | 8/1995 | Serizay | H01R 13/6582 | 439/607.17 |
| 7,005,573 | B2 | 2/2006 | Lionetta | | |
| 8,173,250 | B2 | 5/2012 | Greiner et al. | | |
| 9,281,579 | B2 | 3/2016 | Davis et al. | | |
| 9,385,458 | B2 | 7/2016 | Jeon et al. | | |
| 9,748,697 | B2 | 8/2017 | Patel | | |

(Continued)

FOREIGN PATENT DOCUMENTS

| | | | |
|---|---|---|---|
| CN | 102623852 | A | 8/2012 |
| CN | 103515796 | A | 1/2014 |

(Continued)

OTHER PUBLICATIONS

Chinese Office Action with English translation thereof, dated Nov. 14, 2023 in Application No. 202010122845.3, 13 pages.

*Primary Examiner* — Jean F Duverne

(57) ABSTRACT

An electrical connector including a housing defining an interior cavity and extending from a mounting end to an engagement end, and at least one signal component disposed within the interior cavity of the housing. The housing is formed from a conductive composite material and engages the at least one signal component to shield the interior cavity.

12 Claims, 8 Drawing Sheets

(56) References Cited

U.S. PATENT DOCUMENTS

| | | | | |
|---|---|---|---|---|
| 10,193,281 | B1 * | 1/2019 | Rossman | H01R 13/6584 |
| 10,505,309 | B2 | 12/2019 | Poterjoy | |
| 2008/0246555 | A1 * | 10/2008 | Kirk | H01R 13/514<br>333/125 |
| 2012/0329323 | A1 * | 12/2012 | Fink | H01R 13/65912<br>264/104 |
| 2013/0109232 | A1 | 5/2013 | Paniaqua | |
| 2015/0289366 | A1 | 10/2015 | Frey | |
| 2015/0325954 | A1 | 11/2015 | Malervy | |
| 2016/0285204 | A1 | 9/2016 | Morgan | |
| 2017/0145170 | A1 | 5/2017 | Das et al. | |
| 2018/0120257 | A1 * | 5/2018 | Asiri | G01N 27/308 |

FOREIGN PATENT DOCUMENTS

| | | | | | |
|---|---|---|---|---|---|
| CN | 106025719 | A | | 10/2016 | |
| CN | 106356688 | A | | 1/2017 | |
| CN | 108365465 | A | | 8/2018 | |
| JP | 2000505746 | A | * | 5/2000 | |
| JP | 2004128418 | A | * | 4/2004 | H01L 24/24 |
| JP | 2005032499 | A | * | 2/2005 | H01B 11/146 |
| JP | 6170725 | B2 | * | 7/2017 | |

* cited by examiner

HIGH SPEED CONNECTOR WITH MOLDABLE CONDUCTORS

CROSS REFERENCE TO RELATED APPLICATIONS

This application is a continuation application of U.S. patent application Ser. No. 16/286,840 filed Feb. 27, 2019, entitled High Speed Connector With Moldable Conductors, the subject matter of which is herein incorporated by reference.

BACKGROUND OF THE INVENTION

The subject matter herein relates generally to high speed connectors.

Communication systems exist today that utilize high speed electrical connectors to transmit data. For example, network systems, servers, data centers, and the like may use numerous high speed electrical connectors to interconnect the various devices of the communication system.

Typically, these high speed electrical connectors include signal components, or layers that are sandwiched, or positioned, between two ground layers. The ground layers are sometimes provided as a plastic shell that is metalized. A metal shielding layer is then placed outside of each ground layer, primarily to hold ground contacts that are inserted into slots on the end of the metallized plastic shell. The high speed electrical connector includes interconnecting pin members for electrically connecting the connector to a printed circuit board (PCB).

However, during the manufacturing process, numerous steps are required to form the individual layers. Each step adds complexity and additional connection points. For example, when metallization of the plastic shell occurs, the shell can become warped, resulting in discarding of the layer, or connector. Additionally, part geometries with deep and/or small cross-section contact cavities are difficult to metallize via plating or physical vapor deposition (PVD) processes.

Accordingly, there is a need for electrical connectors and a method of manufacturing the same that reduce manufacturing time, reduce material waste, and increase manufacturing efficiencies, while providing a robust high speed electrical connector.

BRIEF DESCRIPTION OF THE INVENTION

In an embodiment, an electrical connector including a housing defining an interior cavity and extending from a mounting end to an engagement end, and at least one signal component disposed within the interior cavity of the housing. The housing is formed from a conductive composite material and surrounds the at least one signal component to shield the interior cavity.

In another embodiment, a method of manufacturing an electrical connector is provided that includes forming a signal component, and molding a housing to include a conductive composite material having metallic particles. The method also includes securing ground contacts to the housing, and assembling the signal component and housing to form the electrical connector.

In yet another example, an electrical connector is provided that includes a housing defining an interior cavity and extending from a mounting end to an engagement end, and at least one signal component disposed within the interior cavity and extending from the mounting end to the engagement end of the housing. The electrical connector also includes a shell section formed from a conductive composite material forming an outer wall of the housing to shield the interior cavity.

DETAILED DESCRIPTION OF THE INVENTION

Embodiments set forth herein may include methods of manufacturing electrical connectors utilizing a molded conductive composite material to form the housing, or outer shell sections that are included as part of the housing of an electrical connector. By utilizing molding techniques, ground contacts may be secured within a conductive composite material, thereby eliminating plated plastic grounds that are costly and difficult to make consistently. The manufacturing process also allows for design of components that cannot be manufactured, or manufactured affordably, with current processes as a result of complex geometries. Metallic ground members such as printed circuit board (PCB) interface compliant pins thus can now be insert-molded into the conductive housings in order to tie the grounds together electrically. Additionally, the manufacturing method provides for electrical connectors with improved mechanical strength, and improved resistance of ground connections to environmental degradation. In addition, by having a three-dimensional ground structure, crosstalk reduction, and resonance suppression is also achieved.

Figure 1:
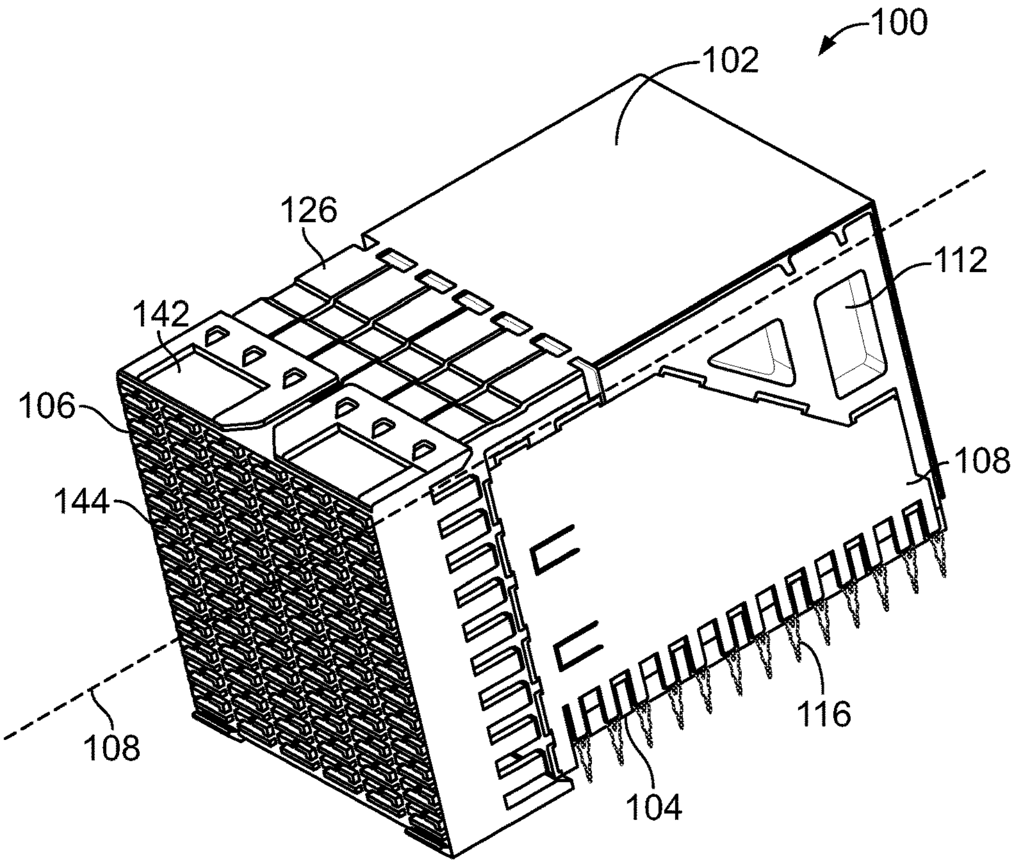
FIG. 1 is a front perspective view of an electrical connector in accordance with an exemplary embodiment.
Figure 2:
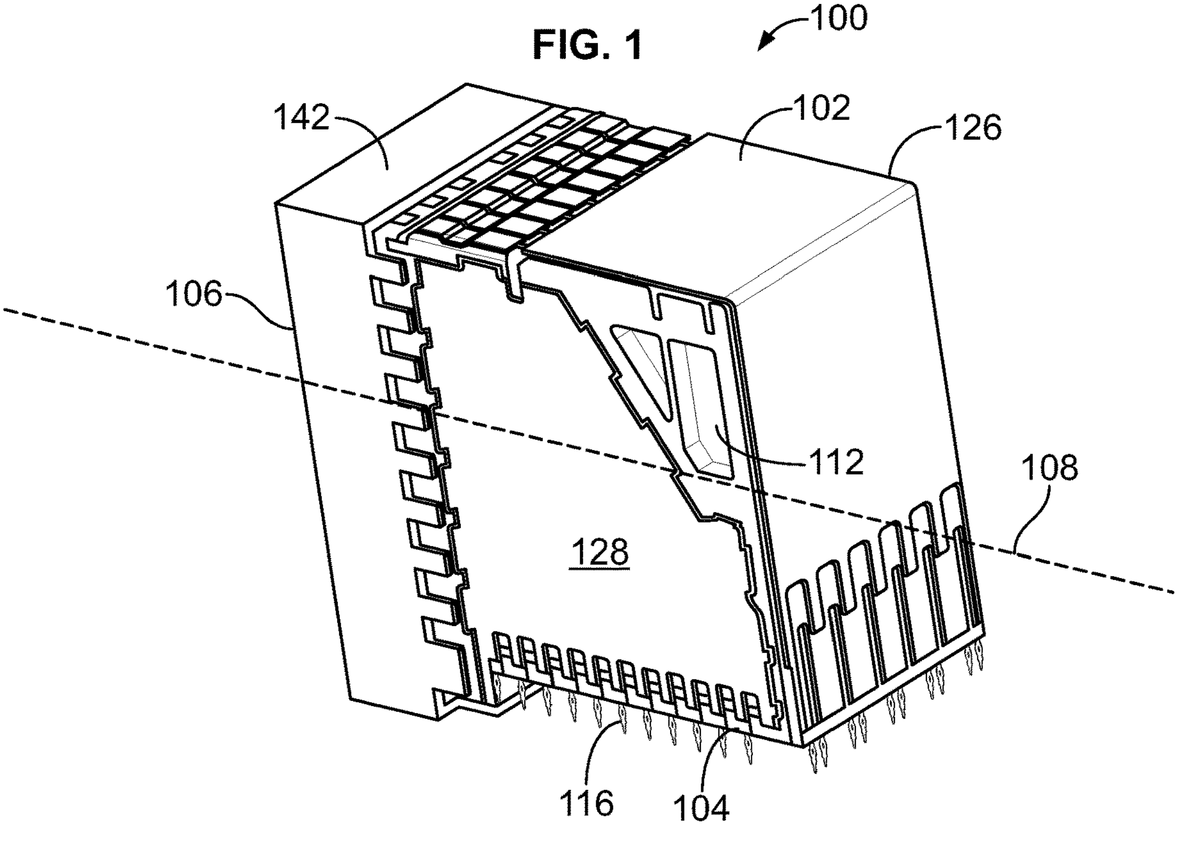
FIG. 2 is a back perspective view of an electrical connector in accordance with an exemplary embodiment.
Figure 3:
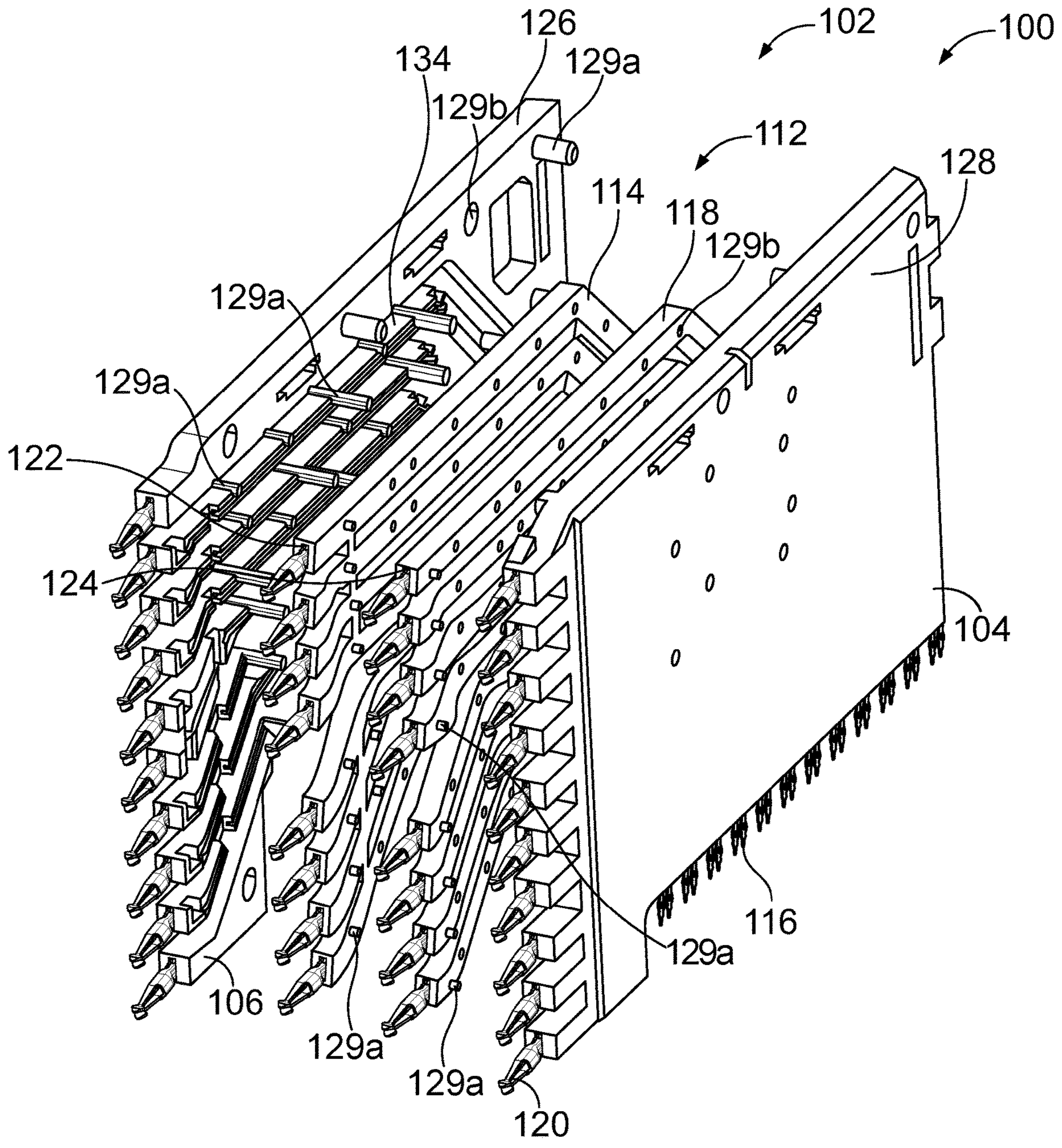
FIG. 3 is an exploded front perspective view of an electrical connector in accordance with an exemplary embodiment.
Figure 4:
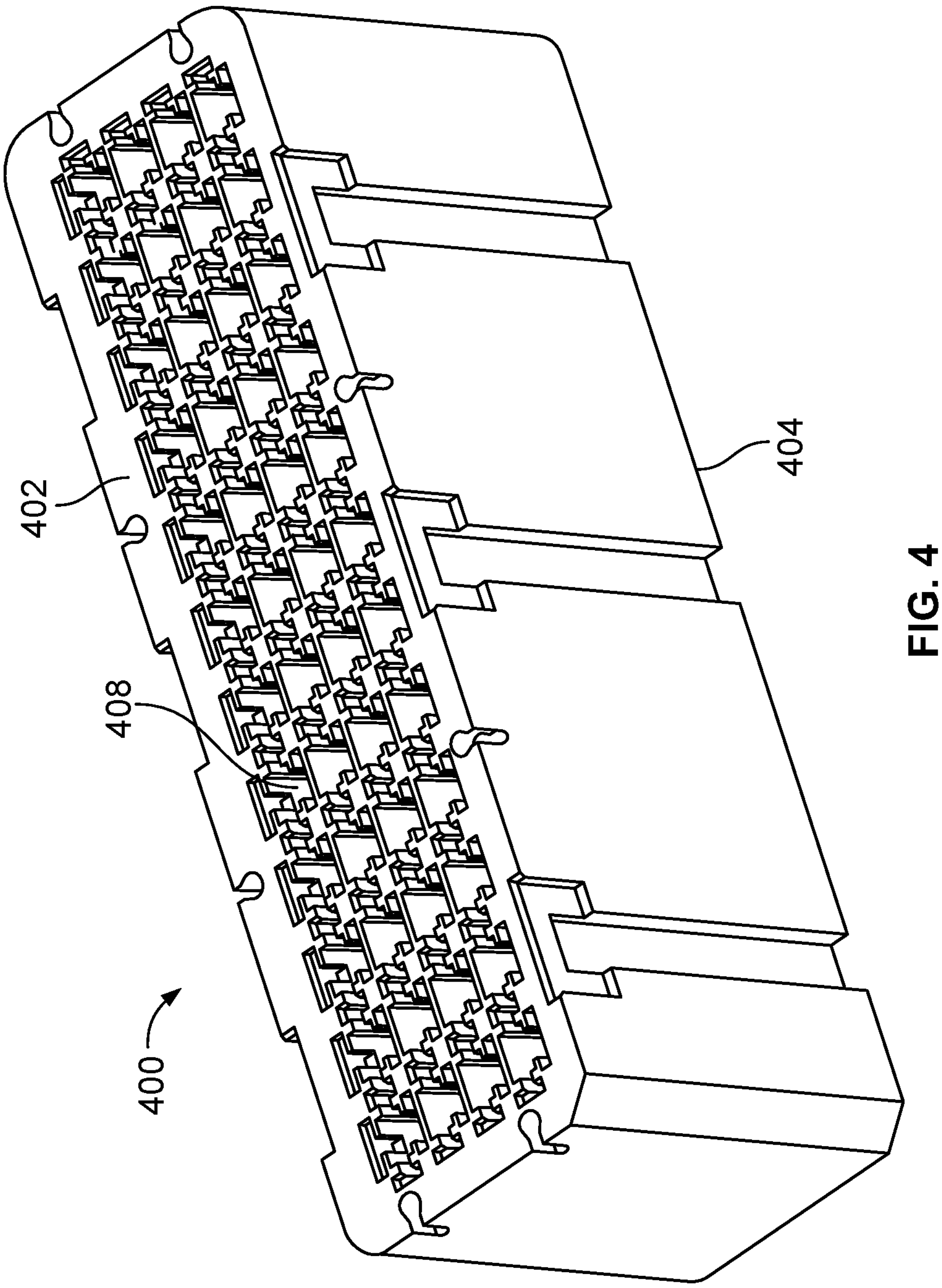
FIG. 4 is a perspective view of an electrical connector in accordance with an exemplary embodiment.
Figure 7:
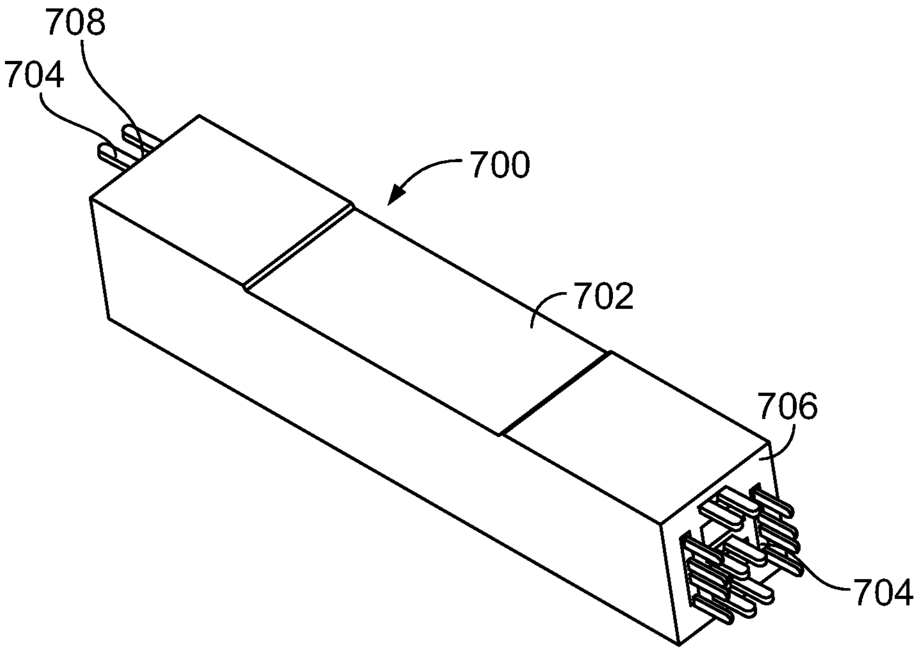
FIG. 7 is a front perspective view of an electrical connector in accordance with an exemplary embodiment.
Figure 8:
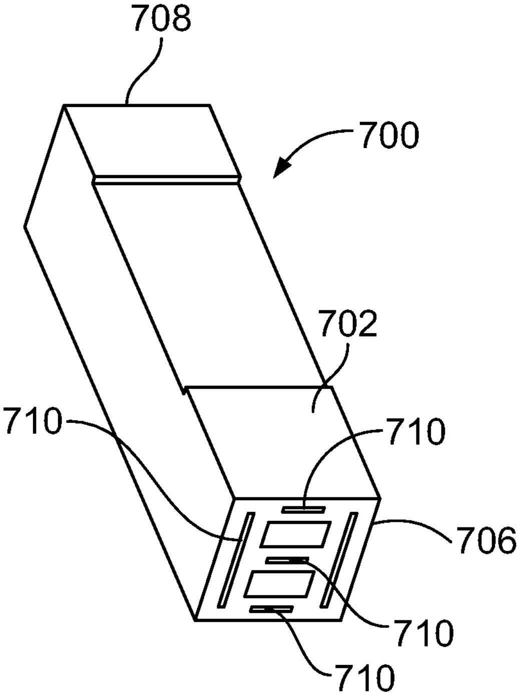
FIG. 8 is an exploded front perspective view of an electrical connector in accordance with an exemplary embodiment.

FIG. 1 is a front perspective view of an electrical connector 100. FIG. 2 illustrates a back perspective view of an electrical connector. FIG. 3 illustrates an exploded front perspective view of component layers that form a housing 102. Specifically, the electrical connector 100 has a housing 102 that extends from a mounting end 104 to an engagement end 106. In the illustrated embodiment, the mounting and engagement ends 104, 106 are transverse to one another with the mounting end 104 extending perpendicular to a longitudinal axis 108 and the engagement end 106 extending parallel to the longitudinal axis 108. As such, the electrical connector 100 may be characterized as a right angle connector. However, in alternative embodiments (including as illustrated in FIGS. 4, 7-8), the electrical connector 100 may be a vertical connector in which the respective mounting and engagement ends are located on opposite sides of the housing 102 and extend parallel with respect to each other. In example embodiments, the mounting end 104 is configured to engage and/or receive respective electrical components, such as circuit boards and/or electrical components on a circuit board (not shown). In one example the circuit board is a printed circuit board (PCB). Similarly, in example embodiments, the engagement end 106 is configured to engage and/or receive a secondary connector, components of a secondary connector, an electrical device, or components of an electrical device.

The housing 102 defines an interior 112 that in one example embodiment is configured to receive a first signal component 114 (FIG. 3) and a second signal component 118 (FIG. 3) disposed therein. The first signal component 114 defines a plurality of first channels 122 that each form a pathway from the mounting end 104 to the engagement end 106 to provide an electrical connection between a PCB and a secondary electrical device, or an electrical device. Similarly, the second signal component 118 includes the plurality of second signal component channels 124 that each form a pathway from the mounting end 104 to the engagement end 106 to provide an electrical connection between a PCB and secondary electrical device. In one example, when only a first signal component 114 and second signal component 118 are provided, the first signal component 114 is a left-handed signal (L-signal) component while the second signal component 118 is a right-handed signal (R-signal) component. While the exploded view of FIG. 3 illustrates two signal components, in another example embodiment, only a single signal component is provided, and multiple conductors may be inserted within the housing 102. In one example the single signal component is provided within a pair-in-column connector.

The housing 102 additionally includes a first shell section 126 received by the first signal component 114 and a second shell section 128 received by the second signal component 118. Specially, a plurality of guideposts 129*a* disposed on the individual sections and signal components are received by corresponding openings 129*b* on components and sections to result in the sections and signal components being matingly received and coupled together to prevent movement of the sections and/or signal components after assembly. While in this example the housing 102 includes the first shell section 126 and second shell section 128, in other examples the housing 102 is of one-piece construction and formed during a molding process.

Ground contacts 116, or interconnecting pin elements, are coupled to the housing 102. In one example the ground contacts 116 are overmolded as part of the housing 102. Optionally, the ground contacts 116 are overmolded into the first shell section 126 and into the second shell section 128. Alternatively, the housing 102 is formed from a molding process and the ground contacts 116 are inserted into the housing 102 after the molding process. Optionally, the ground contacts 116 are inserted into the first shell section 126, or into the second shell section 128 after each is formed through a molding process. In an example, openings, cavities, slots, or the like are formed within the housing 102, the first shell section 126 and/or second shell section 128 to accommodate insertion of the ground contacts 116 after the molding process.

The first shell section 126 and second shell section 128 are comprised of a molded conductive composite material that includes metallic particles within a molded material. In one example, the metallic particles are different shapes and sizes to improve conductivity and the shielding effectiveness of the molded conductive composite material. In one example embodiment, the molded conductive composite material is polymer binder based, metal filler based, and the like. Optionally, the conductivity of the molded conductive composite is at least 3000 Siemens/meter. Alternatively, the molded conductive composite has a conductivity of at least 30,000 Siemens/meter. In yet another example, the molded conducive composite has a conductivity in a range between 10,000 Siemens/meter and 40,000 Siemens/meter. Thus, compared to lossy plastics that use carbon-filled polymers and have a conductivity of approximately 10 Siemens/meter, the molded conductive composite material has substantially greater conductivity than the lossy plastics. Similarly, in one example, the molded conductive composite has a resistivity of less than 0.02 Ohm-centimeters. Alternatively, the molded conductive composite has a resistivity of approximately 0.003 Ohm-centimeters. In yet another example, the resistivity is in a range between 0.02 Ohm-centimeters and 0.001 Ohm-centimeters.

The molded conductive composite shell sections 126 and 128 are able to accommodate complex geometry during manufacturing. A mold is able to utilize complex geometries such that when the shell sections 126, 128 are formed, the geometries are presented. This is an advantage not realized by stamping a shielding material as more complete shielding for the first and second signal components 114 and 118 is provided.

The first shell section 126 and second shell section 128 in this example define a perimeter, or outer wall of the housing 102. The first shell section 126 includes a plurality of first shell channels 134 that in one example correspond to first signal component channels 122 of the first signal component 114. In this manner, when the first shell section 126 is secured to the first signal component 114, the first shell channels 134 align with the first signal component channels 122 to form a first passageway.

Similarly, the second shell section 128 includes a plurality of second shell channels (not shown) that in one example correspond to second signal component channels 124 of the second signal component 118. In this manner, when the second shell section 128 is secured to the second signal component 118, the second shell channels (not shown) align with the second signal component channels 124 to form a second passageway.

At the engagement end 106 a contact housing 142 has a plurality of contact cavities 144. Specifically, each contact cavity 144 houses at least one ground contact 120.

FIG. 4 illustrates a perspective view of an electrical connector 400 in accordance with an exemplary embodiment. In this example embodiment, the electrical connector 400 is a vertical electrical connector. The electrical connector 400 includes a housing 402 that extends from a mounting end 404 to a mating end 406. The mounting end 404 includes numerous cavities 408 that include part geometries with deep and/or blind small cross-section contact cavities that are difficult or impossible to metallize via plating or physical vapor deposition (PVD). Specifically, as a result of utilizing a molded conductive composite material to form the housing 402 these part geometries are accomplished, and complex plating techniques are unnecessary.

Figure 5:
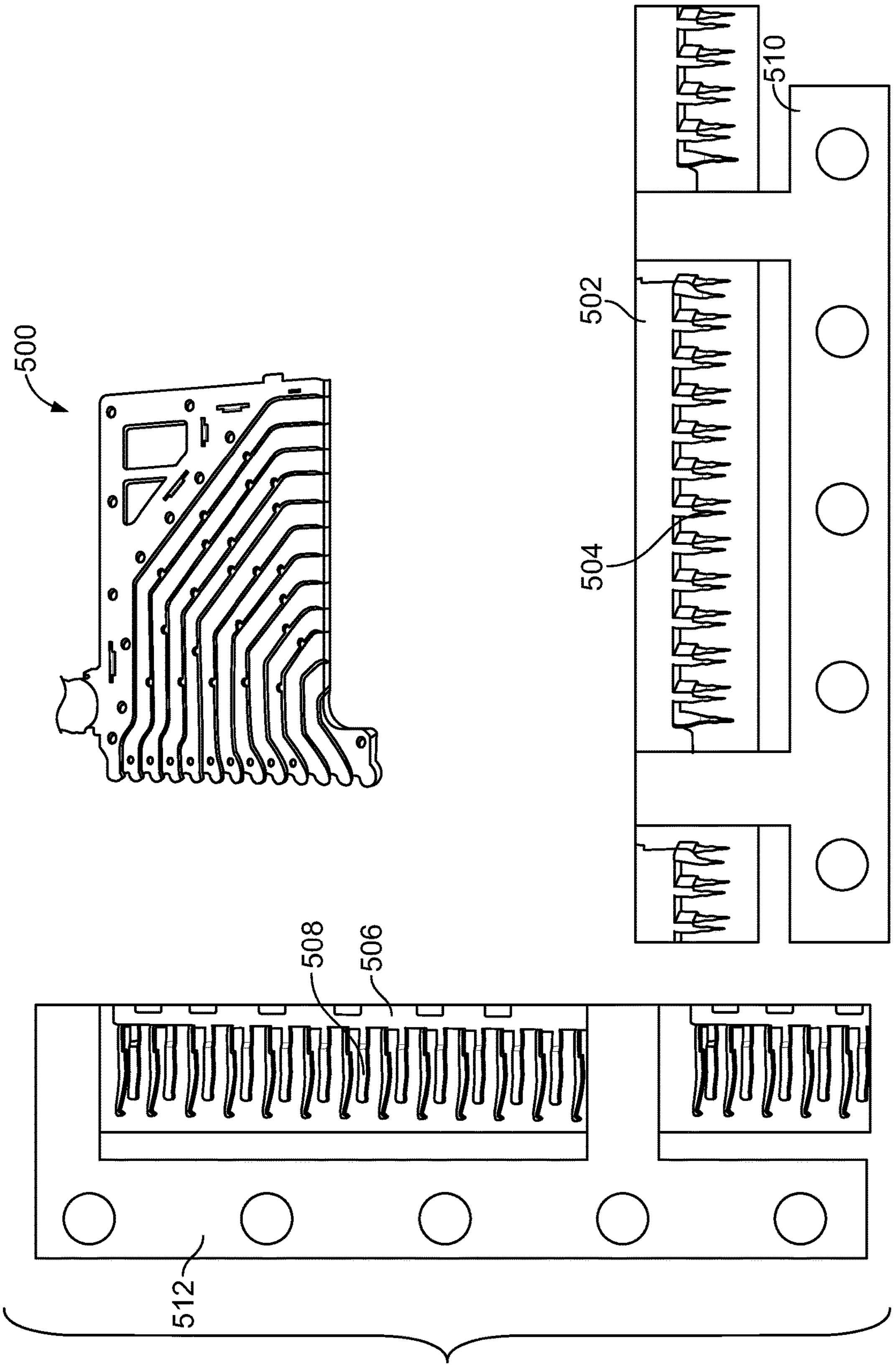
FIG. 5 is a top perspective view of a conductive shell section in accordance with an exemplary embodiment.
Figure 6:
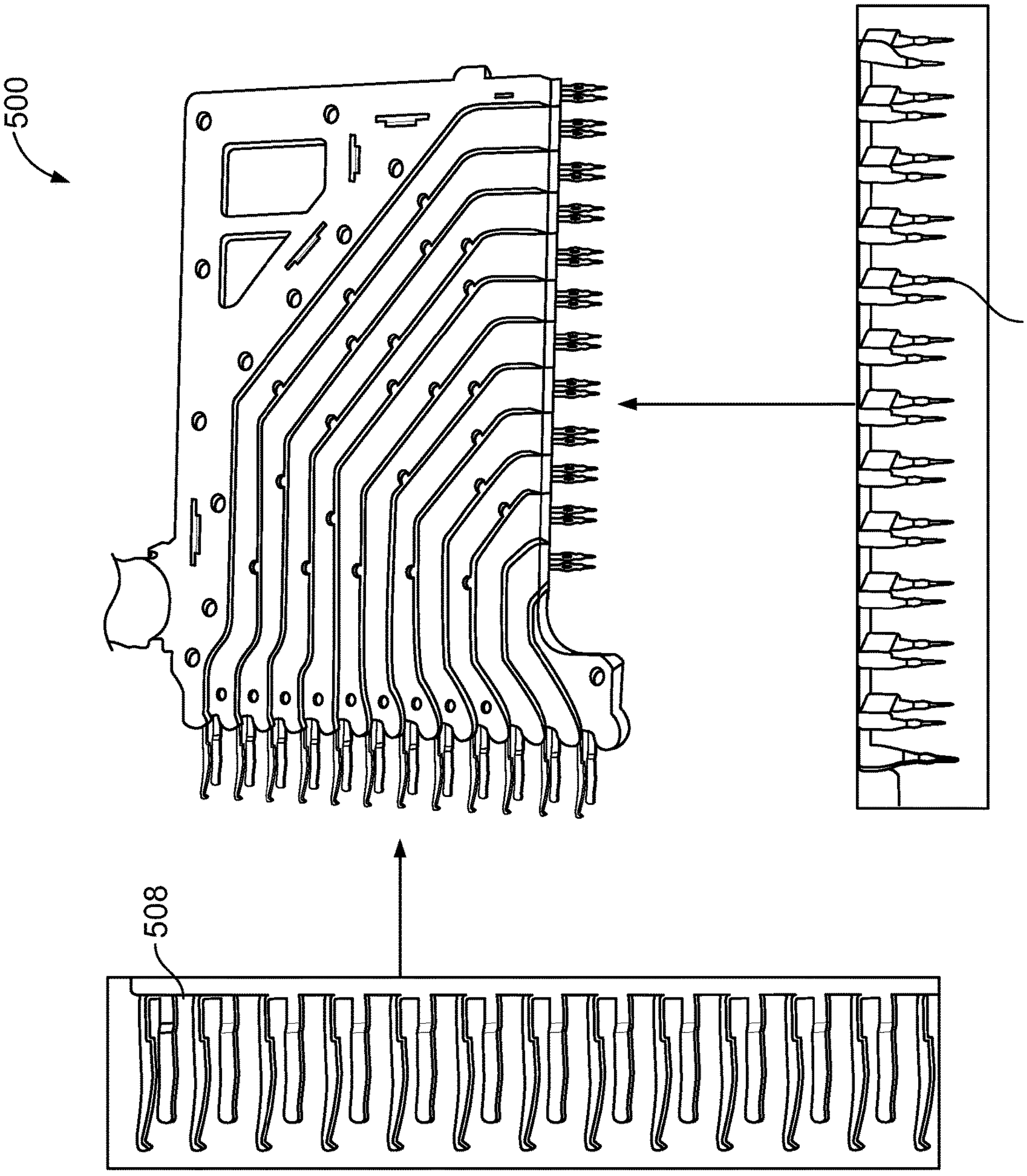
FIG. 6 is a top perspective view of the conductive shell in accordance with an exemplary embodiment.

FIG. 5 illustrates a side perspective view of a conductive shell section 500 before receiving a first strip 502 having a first plurality of ground contacts, or interconnecting pin elements 504 and a second strip 506 having a second plurality of ground contacts, or interconnecting pin elements 508. FIG. 6 illustrates a side perspective view of the conductive shell section 500 after insertion of the first strip 502 and second strip 506 and removal of first and second carriers 510 and 512 from the first strip 502 and second strip 506. As illustrated in FIG. 5, the first strip 502 is coupled to the first carrier 510 while the second strip 506 is coupled to the second carrier 512. In an example, during the manufacturing process the first carrier 510 and second carrier 512 are utilized to insert the first and second strips 502 and 506 into the conductive shell after the molding process. The first and second carriers 510, 512 are then removed and not part of the final conducive shell 500. Alternatively, carriers 510 and 512 are not utilized and the first strip 502 includes the first plurality of interconnecting pin elements 504, while the second strip 506 includes the second plurality of interconnecting pin elements 508, wherein each of the first strip 502 and second strip 506 are overmolded.

In one example the conductive shell section 500 is one of the first or second shell sections 126, 128 of FIGS. 1, 2 and 3. Specifically, the shell section 500 in one example is comprised of a molded conductive composite material that includes metallic particles within a molded material. In one example, the metallic particles are different shapes and sizes to improved conductivity and shielding effectiveness of the molded conductive composite material. In one example embodiment, the molded conductive composite material is polymer binder based, metal filler based, and the like and similar to the conductive composite material previously described above.

Specifically, the conductive shell section 500 is molded such that the conductive shell section is able to accommodate complex geometry during manufacturing. This is an advantage simply not realized by stamping a shielding material. As discussed above, by having the conductive shell section 500 molded from a conductive composite material, the need for separate metalized plastic shield ground used in combination with a metallic shield ground is eliminated. Thus, the need for plated plastic parts is eliminated, and assembly costs are reduced when overmolding the grounds within the conductive composite material.

Similar to the first and second shells, in one example the conductive shell section 500 includes a plurality of channels disposed therein utilized to form electrical pathways. The plurality of first interconnecting pin elements 504 are disposed on a first strip 506. In one example, the first interconnecting pin elements 504 are stamped onto the first strip 502 that is a metal mating interface, typically to connect a printed circuit board (PCB). Similarly, in an example, the second interconnecting pin elements 508 are stamped onto the second strip 506 that is a metal mating interface. In another example, interface contacts are formed as part of the first strip 502 and second strip 506 and are overmolded into the conductive shell section 500 during the manufacturing process. Thus, the first interconnecting pin elements 504 are formed as part of, and are included as part of the conductive shell section 500. Consequently, in examples when interconnecting pin elements are overmolded, subsequent assembly steps are eliminated. Additionally, more robust electric contacts are provided, and a stronger mechanical connection between the first and second interconnecting pin elements 504, 508 and the conductive shell section 500 is achieved. Specifically, by having the first strip 502 and second strip 504 encapsulated in the conductive shell section 500, the internal conductive or metallic particles within the conductive shell section 500 having an increased surface area then comes in contact with the first strip 502, thereby enhancing the electrical connection. Additionally, by encapsulating the first strip 502, and second strip 506, the conductive strips 502, 506 do not interact with materials within an environment exterior to the conductive shell 500 that can degrade an electrical connection. Additionally, because the first strip 502 and second strip 506 are encapsulated and not external to the shell section, ground traces, ground pin elements, or ground strips, can be incorporated together with the conductive strips, eliminating components and stamping processes.

FIG. 7 illustrates an electrical connector 700 utilizing a conductive housing 702. In this example a first shell section and second shell section are of one-piece construction forming a signal shell housing 702. FIG. 8 illustrates an exploded view of the electrical connector with interconnecting pin inserts 704 separated from the conductive housing 702. In this example the conductive housing 702 provides a vertical connector and not presented at a 90 degree angle. Specifically, the conductive housing 702 extends from a mounting end 706 to an engagement end 708 where the mounting end 706 and engagement end 708 are parallel to one another.

The conductive housing 702 is comprised of a molded conductive composite material that includes metallic particles within a molded material. In one example, the metallic particles are different shapes and sizes to improved conductivity and shielding effectiveness of the molded conductive composite material. Specifically, the conductive shell housing 702 is able to accommodate complex geometry during manufacturing. A mold is able to utilize the complex geometries such that when the conductive shell housing is formed the geometries are presented. This is an advantage simply not realized by stamping a shielding material. Thus, when inserts are overmolded the number of steps required during manufacturing is reduced. Additionally, manufacturing complexities and costs are reduced while maximizing efficiencies. Additionally, more complete shielding for signal inserts within the interior of the conductive shell housing 702 is also provided.

In one example embodiment, the conductive shell housing 702 is molded with interconnecting pins disposed therein. Alternatively, as illustrated in FIG. 8, the mounting end 706 and engagement end 708 of the conductive shell housing 702 have slots 710 for receiving interconnecting pin inserts 704 after the molding process for forming the conductive shell housing 702 is completed. Specifically, the interconnecting pin inserts 704 are inserted into the slots 710 and secured therein during formation of the connector 700.

Figure 9:
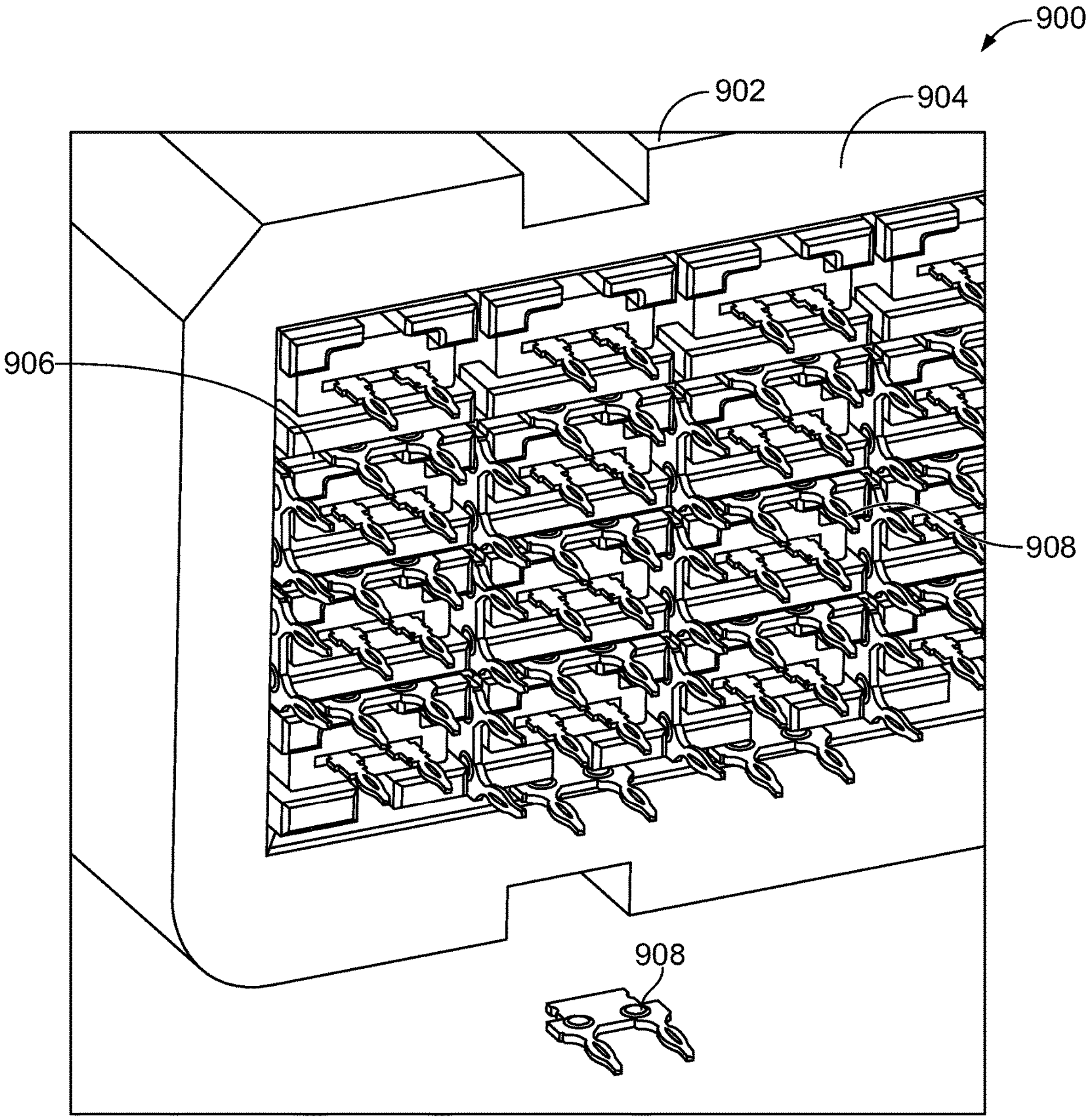
FIG. 9 is a partial exploded front perspective view of an electrical connector in accordance with an exemplary embodiment.

FIG. 9 illustrates a partial exploded view of another example electrical connector 900 formed utilizing molded composite metallic materials as previously described in other example embodiments. In this example, a contact housing 902 at the engagement end 904 of the electrical connector 900 is illustrated. As illustrated, the contact housing 902 includes a plurality of contact cavities 906 disposed therein. A plurality of interconnecting pin inserts 908 are electrically coupled within the cavities 906 to provide improved mechanical and electrical coupling characteristics.

Figure 10:
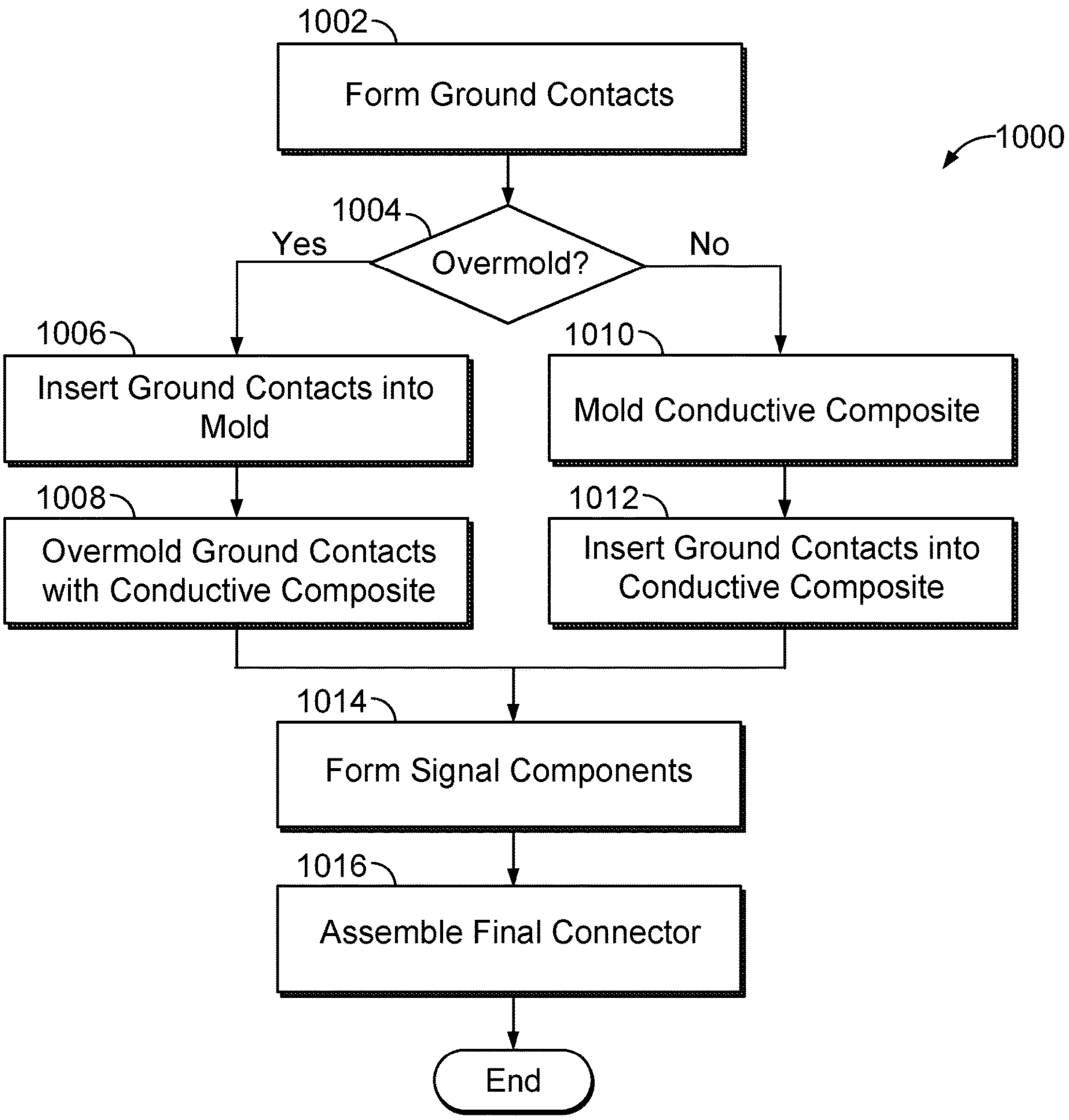
FIG. 10 is a method of manufacturing in accordance with an exemplary embodiment.

FIG. 10 illustrates a method of manufacturing an electrical connector 1000. At 1002, ground contacts are formed. In one example the ground contacts include strips that overmolded by a conductive composite material. Alternatively, the ground contacts are coupled to carriers to facilitate insertion of the ground contacts into a molded housing after a conductive composite housing is formed through a molding process. At 1004, a determination is made regarding whether the ground contacts will be overmolded into the housing of the electrical connector.

At 1004, if the determination is made to overmold the ground contacts into the housing, flow moves to the left and at 1006, and the ground contacts are inserted into the mold. In one example, a plurality of ground contacts are coupled to a metallic strip.

At 1008, the ground contacts are overmolded with a conductive composite material to form a housing. In one example the housing includes a first shell section and a second shell section.

At 1010, if at 1004 a determination is made that the ground contacts will not be overmolded into the housing, then flow moves to the right and the conductive composite material is molded to form the housing. In one example the housing is made with openings such as slots, similar to that provided in relation to FIG. 8. Alternatively, the housing is a multi-piece housing and includes shell sections as illustrated in regard to FIG. 3.

At 1012, ground contact inserts are inserted into the housing formed at 1010. In one example, the ground contact inserts are inserted within slots as illustrated in relation to FIG. 8. Alternatively, the ground contact inserts are inserted into cavities as illustrated in relation to FIG. 9. In each example the housing may be molded to provide geometries associated with the slots, cavities, or the like to facilitate insertion and connection between the inserts and the housing.

At 1014, signal components are formed, and at 1016 the final connector is assembled that includes the signal components and the ground contacts. Thus, regardless if the ground contacts are overmolded into the housing at 1004, or if the housing is molded within the ground contacts and the ground contacts are later inserted into the housing, once the ground contacts and housing are coupled, the signal components are formed, and the connector may be assembled. Alternatively, the signal components are formed before forming the housing, but is still assembled with the housing to create the connector.

By utilizing a molded conductive composite material during this process, the ground contracts may be overmolded with conductive composite or inserted into a molded housing, thereby eliminating plated plastic grounds that are costly and difficult to make consistently. The manufacturing process also allows for design of components that cannot be manufactured, or manufactured affordably, with current processes as a result of complex geometries. Metallic ground members such as printed circuit board (PCB) interface compliant pins can now be insert-molded into the conductive housings in order to tie the grounds together electrically. Additionally, the manufacturing method provides for electrical connectors with improved mechanical strength, and improved resistance of ground connections to environmental degradation. In addition, by having a three-dimensional ground structure, crosstalk reduction, and resonance suppression is also achieved.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. An electrical connector comprising:

a housing defining an interior cavity and extending from a mounting end to an engagement end;

a first signal component disposed within the interior cavity and defining plural first channels that extend from the mounting end to the engagement end of the housing;

a second signal component defining plural second channels that extend from the mounting end to the engagement end of the housing, the second signal component engaging the first signal component disposed within the interior cavity;

a first shell section defining plural first shell channels and formed from a conductive composite material forming a first section of an outer wall of the housing to shield the interior cavity, wherein each of the plural first shell channels aligns with a corresponding first channel of the plural first channels to form an electrical connection between the engagement end and the mounting end; and a second shell section defining plural first shell channels and formed from a conductive composite material forming a second section of the outer wall of the housing to shield the interior cavity, wherein each of the plurality of second shell channels aligns with a corresponding second channel of the plurality of second channels to form the electrical connection between the engagement end and the mounting end.

2. The electrical connector of claim 1, wherein the conductive composite material is a polymer binder that includes metallic particles of differing shapes and sizes.

3. The electrical connector of claim 1, wherein the conductive composite material has a conductivity in a range between 10,000 Siemens per meter and 40,000 Siemens per meter.

4. The electrical connector of claim 3, wherein the conductive composite material has a resistivity in a range between 0.02 Ohm-centimeters and 0.001 Ohm-centimeters.

5. The electrical connector of claim 1, wherein the housing at the mounting end is configured to couple to a printed circuit board, and at the engagement end is configured to couple to an electric component; wherein the plural first channels of the first signal component each form a pathway between the printed circuit board and the electric component; wherein the plural second channels of the second signal component each also form a pathway between the printed circuit board and the electric component.

6. The electrical connector of claim 1, comprising a plurality of ground contacts secured to the housing.

7. The electrical connector of claim 6, wherein the ground contacts are molded into the housing formed from the conductive composite material.

8. The electrical connector of claim 6, wherein the housing formed from the conductive composite material includes at least one slot that receives a ground contact insert that includes the ground contacts.

9. The electrical connector of claim 1, wherein the housing is of one-piece construction.

10. The electrical connector of claim 1, wherein the mounting end of the housing is transverse to the engagement end of the housing.

11. The electrical connector of claim 1, wherein the first shell section receives and is molded together with ground contacts.

12. The electrical connector of claim 11, wherein the conductive composite material has a conductivity of at least 10,000 Siemens per meter and a resistivity that is less than 0.02 Ohm-centimeters.

* * * * *